United States Patent Office 3,608,097
Patented Sept. 28, 1971

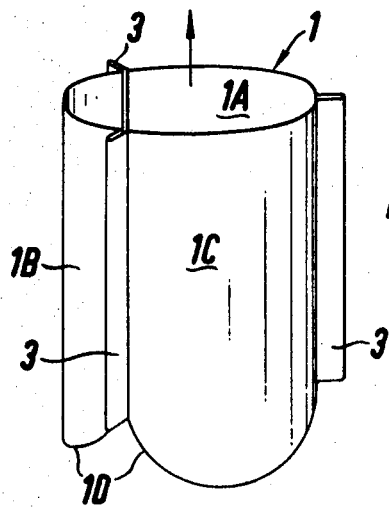
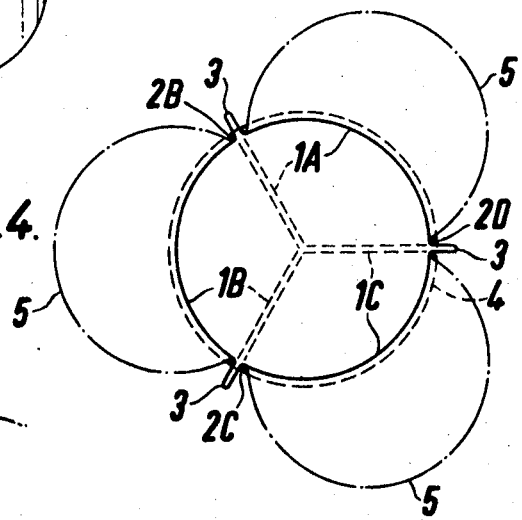
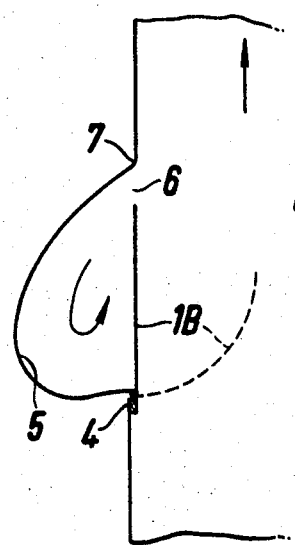
FIG. 1.
FIG. 4.
FIG. 5.

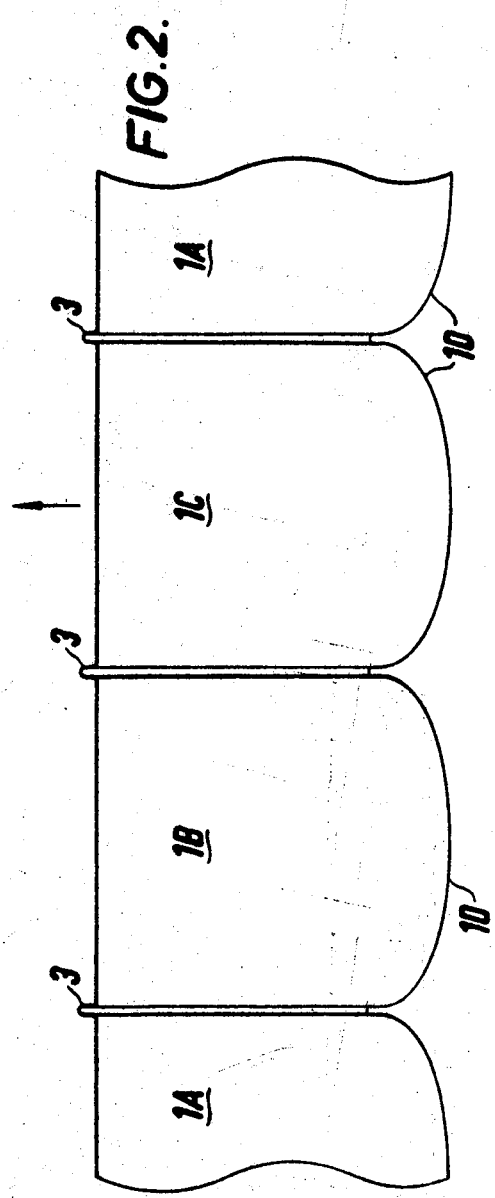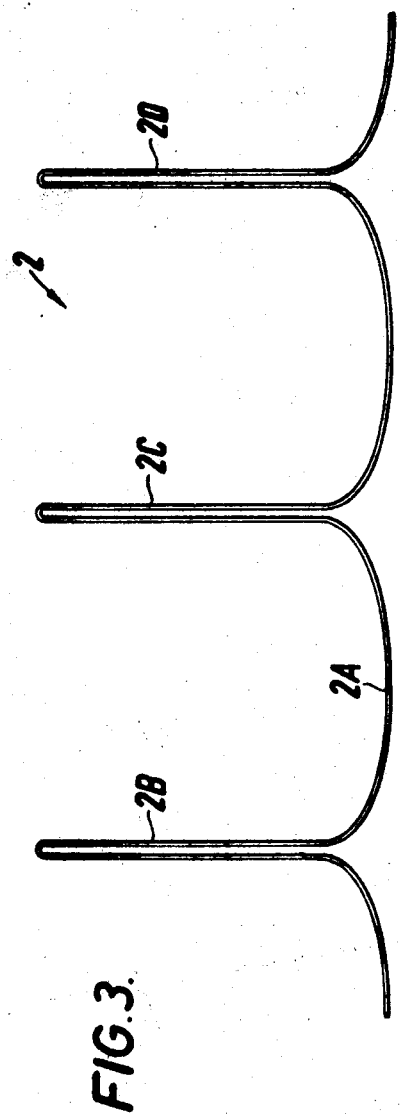

3,608,097
NON-RETURN VALVES PARTICULARLY AS PROSTHETICS
Brian John Bellhouse, The Ridings, Islip, near Oxford, Oxfordshire, England; and Francis Hewitt Bellhouse, 34 Hill Rise; and Kenneth Grant Reid, Marlborough Crescent, both of Old Woodstock, Oxfordshire, England
Filed Jan. 3, 1969, Ser. No. 788,743
Claims priority, application Great Britain, June 28, 1968, 30,888/68
Int. Cl. A61f 1/22; F16k 15/14
U.S. Cl. 3—1                              9 Claims

ABSTRACT OF THE DISCLOSURE

A check-valve which is particularly though not solely applicable as a prosthesis in cardiac surgery: it concerns a valve which has plural cusp-like pliable elements which are associated with a duct formation such as to afford a fluid-dynamic pressure effect tending to close the valve the arrangement of the valve being such as to minimize turbulence when fluid flows through it. The cusps are supported by a rigid frame having three upstanding posts spaced about 120° apart and form a substantially cylindrical opening when the valve is at rest. The cusps are moved to the closed position when reversal of fluid flow occurs through the valve.

BACKGROUND OF THE INVENTION

Investigations by various techniques have shown that the aortic valve mechanism of the heart involves adaptations which, whilst being provided by nature to suit the requirements in the heart, may also have application in other circumstances in which a check-valve has to open and close according to pulsating flow; in which minimal turbulence is important; and in which valve closure when the flow is pulsatingly reversed not only occurs very promptly with minimum regurgitation but may even precede any, or any substantial, flow reversal. When the fluid is blood, the minimalization of turbulence is a requirement in order to reduce the risk of promoting anaemia or thrombi in the bloodstream. Requirements of an analogous kind may arise with other fluids because they are sensitive to turbulence, for example milk—so that the invention may find application in milking machines or milk handling systems.

It has been ascertained by investigation that prosthetic valves (or substitute valves) as used in cardiac surgery, have certain defects which may have adverse long-term effects on the patient, and that such defects arise from ignoring the hydrodynamic phenomena which are caused by their design and installation. Existing valves in this usage are such as to induce turbulence and impart effects which are recognised causes of anaemia and thrombi in the bloodstream. Various examinations of the situation, including visual cinematographic inspections of transparent simulation models, confirm that the natural configuration of the passages involved in heart valves not only results in a proper actuation of the valving elements (the cusps) themselves but is also such as to result in minimum harmful turbulence.

The invention, as a result of such investigations, is concerned to provide as an artefact, a valve which behaves in the manner of a natural animal tricuspid valve; being an artefact it may, however, be used in other situations where like requirements arise.

It was observed by Leonardo da Vinci in his remarkable studies of anatomy, and without knowledge of vascular circulation, that the aortic valve of the heart comprised a tricuspid arrangement and that each cusp corresponded to a sinus of lobe-like form in the valved section of the blood vessel and he predicted that vortices would be formed behind the cusp in the sinus. A reference to Da Vinci's prediction is to be found in "Keeler, K. D. 'Leonardo da Vinci on Movement of the Heart and Blood' (81) published by Harvey and Blythe, Limited. London 1952." This hydrodynamic finding seems to have been ignored or overlooked. The present inventors, having investigated the action of the tricuspid valve with the aid of modern techniques, have perceived by investigation what needs to be done to make a tricuspid valve reliable, efficient, and operable in its intended application, but have applied such observation in a practical manner. The invention stated below is the result of such investigation. It then arises that a valve according to the invention is not only useful as a surgical prosthetic; it may be used (for example) in the pumping of liquids which for one reason or another are difficult to deal with in ordinary ways. For example the valve may be used to control the flow of a liquid which is sensitive to turbulence, such as a clotting liquid (of which though blood is perhaps the best example, milk is another example) or a liquid which has sludgy or solid suspension in it.

Ball valves used prosthetically have several disadvantages, as also have hinged flap valves. Neither type results in a flow which, downstream from the valve, is not seriously turbulent. It seems that with these valves, and also with a previously known tricuspid flexural valve, it has been assumed by previous observers including Da Vinci that the valve should be closed at rest and that a criterion of its performance should be a low opening pressure. According to our findings such assumption is fallacious; we assume (and it is basic in this invention) that the valve at rest should be open.

An object of the invention is the provision of a prosthetic aortic heart valve which is mechanically and hydrodynamically more efficient and effective than known prostheses.

Another object is the provision of a prosthetic heart valve which will close with minimal regurgitation, its closure not being due only to flow reversal of the main flow through the valve but to a secondary hyydrodynamic cause.

Another object is the provision of a check valve to operate in response to pulsations in a fluid flow which gives rise to very low turbulence when it is open.

Another object is to provide a construction for a prosthetic check valve, which enables it to be economically made in a very reliable form of great longevity, and which is well adapted to implantation in living tissue.

DESCRIPTION OF THE INVENTION

According to this invention a non-return or check valve for use in a pulsating flow in a duct comprises three flexible cusps which at rest tend collectively to assume the approximate form of a cylinder approximately coaxial with the duct, and each is associated with a sinus or vortex chamber behind it in the wall of the valved duct, such chamber being so flow-connected to the duct that (a) It creates a stagnation point in the region of its downstream side and it accommodates a vortex induced by the flow in the duct and maximalized by the maxim ducted flow, (b) Such hydrodynamic effect persisting after the subsidence of maximal flow, initiates closure of the valve (that is by causing an inwardly-operating pressure difference through the cusp) and this having thrust the cusp inwards across the duct ensures that a small return flow in the duct completes the closure of the valve, and (when the invention is applied as a prosthetic aortic valve), (c) The high pressure in the sinuses may be used to cause blood flow in artificial coronary arteries.

The invention in its first aspect therefore includes a tricuspid valve in which each cusp is associated with a sinus behind it formed in the duct wall, and the three cusps collectively and when relaxed, lie approximately in the figure of a cylinder: thus the valve is open when at rest.

In a further aspect, the cusps are formed with their downstream or distal margins as 120° arcs of a circle of approximately the diameter of the valved duct and these margins are free and flexible. They are preferably slightly longer (linearly) than the arc so prescribed, in the $\pi$ ratio, so that when they constrict to form a closed valve, they meet along three radii at 120° and their lengths are such that they not only meet but even have superfluous length so that they have to deflect by a small dimension, which ensures that they rest one against the other. This will be easier to understand from the following description.

According to a further feature of the invention, a valve comprises an almost cylindrical formation of flexible material, which may be very slightly conical, in which the cylindrical form is secured along three axially directed lines at 120 degrees (related to the cylinder axis) so that the three arcuate distal margins (being cusps) will distend to complete an approximate circle, and can be constricted so that each lies in two approximate radii, the three then in complement forming a total closure of the duct of which the cylinder originally formed a part. The root or upstream i.e. proximal margin of the cylindrical formation is preferably secured to a ring adapted to be fitted into the valved duct. In the case of a cardiac valve this ring is a suture ring and may be scalloped as seen in external elevation, with three lobes corresponding to the valve cusps. This ring may have a stainless metal or plastic base, and the base itself preferably supports three prongs extending axially, to which the flexible cylinder is attached (as referred to) at 120°.

However, in the cardiac valve case the base of the cylinder may simply be a suture ring, and the three lines of attachment which define the three cusps may be stiffeners, each of which has a perforation for a suture at its downstream end.

As an example of variation within the scope and spirit of the invention, the valve may be made originally on a rigid skeleton to enable the surgeon to handle it, and the skeleton or at least its annular base portion, may be removable after suturing of the valve, or may be harmlessly soluble in the bloodstream.

The invention may take the form of a valve unit for implantation in a duct which already has the three sinuses in which case it must of course be so fixed that the cusps register with the sinuses; or it may be made as a complete section for fitting in the length of a duct, with its own wall provided with the sinuses. The latter form is that which the valve will ordinarily take if it is for uses other than implantation, for example in connection with milk apparatus as above referred to.

An example of the valve, as intended to be made for permanent cardiac implantation, will now be described with reference to the accompanying illustrative drawings, in which:

FIG. 1 is a perspective view showing the pliable sheet material valve element in rudimentary form;

FIG. 2 illustrates as a flat development (in an untrue but illustrative perspective way) the valve element as it is proposed to be made;

FIG. 3 illustrates as a flat development a metal or plastics virtually rigid skeleton to carry the element of FIG. 2;

FIG. 4 is a cross-sectional illustration of the valve in place in a duct (for example the aorta) showing its relation to the valsalva sinuses; and FIG. 5 is a diagram illustrating the relationship between a valve cusp (in open and closed positions) and the duct wall including the corresponding sinus.

The valve element 1 is of substantially cylindrical formation; the illustrative arrows indicate the sense of direction of the bloodstream. The element 1 is preferably of Terylene, nylon or polypropylene covered with silicone rubber. It is divided into three panels forming cusps, 1A, 1B, and 1C, each arcuately subtending 120° of the cylindrical section. As is seen in FIG. 2 the upstream or proximal margin of each cusp is scalloped as at 1D. The element 1 is supported by a metal or plastic skeleton 2, shown developed flat in FIG. 3. The skeleton 2 forms a scalloped annular ring 2A, and formed by bending up from this, three posts formed in hairpin-like manner at 2B, 2C, and 2D. Folds shown at 3 in the element 1 extend radially outwards and are nipped in the posts 2B, 2C, and 2D which represent commissures of the cardiac valve. This construction allows the free downstream or distal margins of the cusps 1A, 1B, 1C to be of slightly greater length than the true circular arc would be if the valve were truly cylindrical. In theory, the margin of each cusp should be $\pi/3$ of the valve diameter in order that the three distal margins completely meet when the valve is closed as shown in dotted line in FIG. 4. In practice, however, the extra length is made slightly larger than the theoretical requirement to ensure that the three cusps always fully meet and mutually seal. The upstream margin of the element 1 is secured to the annular part 2A of the skeleton 2 preferably by completely enclosing the part 2A and then being stuck and stitched; the annular part is then provided with a suture ring 4 externally to enable it to be sutured to the duct wall (as seen in FIG. 5) the suture ring being for example of Terylene velour. The posts 2B, 2C, 2D form or have loops or holes at their distal extremities for a suture to the duct wall between the sinus.

The invention is not confined to this mode of manufacture; the valve may be manufactured as a single unit from a single material such as polypropylene or a 2-phase material such as polypropylene-silastic.

In FIGS. 4 and 5 can be seen the relationship of the cusps to the sinuses. In FIG. 4 the walls of the three sinuses are indicated in chain line at 5 and one is shown in sectional form at 5 in FIG. 5. It is seen from FIG. 5 that a cusp (1B) in its open and rest position shown in full line almost occludes the related sinus but that a gap is left at 6 between the distal margin of the cusp 1B and the ridge of the sinus which is at 7. The closed position of the cusp 1B is diagrammatically indicated in dotted line in FIG. 5. It will have been noted that the natural "rest" position of the valve is open (full line in FIGS. 4 and 5) and this is a feature of the invention. At peak flow through the valve a strong vortex is set up in the sinus as indicated by the flow-arrow therein in FIG. 5; then as the flow falls off the persisting vortex thrusts the cusp inwards and it is near to closure by the time there is an actual reversal of flow in the duct, which reversal completes the valve closure. The valve would open spontaneously if there were no pressure difference across it, but in fact the next pulse of flow is probably of even greater effect in opening it. The axial length of the cusps is about one duct-diameter.

The valve so described is for implantation in a duct which has sinuses. The invention, however, includes the provision of such a valve already integrated with a length of duct which is provided with sinus-like lobes or cavities, so that the complete unit can be inserted in a duct whether by way of implantation or for some entirely external flow-control purpose. In this embodiment the relation of the valve to the duct will be substantially the same as that shown in FIGS. 4 and 5, it being understood, however, that the suture ring 4 will now be a mounting ring integral with the wall of the duct. In such case, the maximum radial depth of the sinus is preferably about equal to the radius of the valved duct. Such a valve if for aortic substitution may incorporate artificial coronary arteries connected to the sinuses.

We claim:

1. A valve comprising a substantially cylindrical structure of pliable material of axial length greater than its radius;

substantially rigid structure supporting said cylindrical structure along three axially directed lines which are spaced about 120° apart around the cylinder and dividing said cylindrical structure into three cusps, means for attaching said rigid structure to a duct wall of a duct to be valved along corresponding axially directed lines, said duct wall being provided with sinuses between said corresponding axially directed lines, to position each of said cusps into correspondence with one of said sinuses; and substantially annular rigid structure supporting one end of said cylindrical structure in annular manner with diameter approximately equal to that of the duct to be valved, said substantially annular rigid structure being adapted for attachment to said duct wall upstream of said sinuses;

the opposite end of said cylindrical structure being unsupported between said axially directed lines, whereby the edge of said cylindrical structure and the edges of the cusps at said opposite end are distal edges, said cylindrical structure being normally cylindrical at rest with the distal edges of said cusps defining a substantially circular normally open valve opening, said pliable material of said substantially cylindrical structure having sufficient rigidity to be self-supporting when at rest and being so constructed that it will open spontaneously when there is no pressure difference thereacross, said cusps being adapted to be thrusted inwardly by vortices in said sinuses during flow downstream of the duct to bring the distal edges of said cusps into near closure, the closure of said cusps being completed upon reversal of flow in said duct.

2. Valve according to claim 1 and for implantation, further comprising a suture ring attached peripherally to the said annular rigid structure.

3. Valve according to claim 1, in which said cylindrical structure is flexible sheet plastic material and said two substantially rigid structures are constituted by an annularly-formed skeletal element of relatively rigid wire formed with three hairpin-like posts extending axially corresponding to the commissures of a natural tricuspid valve.

4. Valve according to claim 3, in which said skeletal element is formed at its proximal annular end in a scalloped manner.

5. Valve according to claim 1, in which the total length linearly measured of the distal edge of said cylindrical structure is somewhat greater than three times the diameter of the annulus defined by the valve.

6. Valve according to claim 3 and for implantation as a prosthesis, in which said posts provide at their distal ends means for the securing therewith of sutures.

7. Valve according to claim 1 for implantation at a prosthesis, in which the axial length of the cusps is less than the maximum axial dimension of the sinuses with which they repectively correspond.

8. A valve according to claim 1 further comprising a substantially rigid tubular body forming a portion of the duct to be valved, the inner wall of said tubular body being said duct wall, said sinuses being formed in said inner wall.

9. A valve according to claim 8, wherein the ends of the sinuses corresponding to said opposite end of said cylindrical structure are always in open communication with fluid within said duct to be valved.

References Cited

UNITED STATES PATENTS

| 279,451 | 6/1883 | Sinclair | 137—525.1 |
|---|---|---|---|
| 2,832,078 | 4/1958 | Williams | 3—1 |
| 3,197,788 | 8/1965 | Segger | 3—1 |
| 3,445,916 | 5/1969 | Schulte | 3—1X |

FOREIGN PATENTS

| 158,988 | 5/1964 | U.S.S.R. | 3—1HV |
|---|---|---|---|

OTHER REFERENCES

"A prefabricated semirigid tricusp aortic valve prosthesis" by E. A. Hessel et al., The Journal of Thoracic and Cardiovascular Surgery, vol. 54, No. 2, August 1967, pp. 227–241 relied upon.

RICHARD A. GAUDET, Primary Examiner

R. L. FRINKS, Assistant Examiner

U.S. Cl. X.R.

3—Dig. 3; 137—525.1